US012586164B2

(12) United States Patent
Kim

(10) Patent No.: US 12,586,164 B2
(45) Date of Patent: Mar. 24, 2026

(54) VEHICLE CONTROL APPARATUS AND METHOD THEREOF

(71) Applicants: Hyundai Motor Company, Seoul (KR); Kia Corporation, Seoul (KR)

(72) Inventor: Hyun Ju Kim, Yongin-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 155 days.

(21) Appl. No.: 18/635,115

(22) Filed: Apr. 15, 2024

(65) Prior Publication Data

US 2025/0086759 A1 Mar. 13, 2025

(30) Foreign Application Priority Data

Sep. 11, 2023 (KR) ........................ 10-2023-0120568

(51) Int. Cl.
*G06T 5/70* (2024.01)
*G06T 7/00* (2017.01)

(52) U.S. Cl.
CPC .............. *G06T 5/70* (2024.01); *G06T 7/0002* (2013.01); *G06T 2207/10028* (2013.01); *G06T 2207/30168* (2013.01); *G06T 2207/30252* (2013.01)

(58) Field of Classification Search
CPC ..................... G06T 5/70; G06T 7/0002; G06T 2207/10028; G06T 2207/30168; G06T 2207/30252; G01S 7/4808; G01S 17/58;

G01S 17/931; G01S 7/4802; G01S 17/894; G06V 20/588; G06V 20/56; B60W 50/00; B60W 2050/0059; B60W 40/02; B60W 2420/408

See application file for complete search history.

(56) References Cited

U.S. PATENT DOCUMENTS

| | | | |
|---|---|---|---|
| 11,945,472 B2 * | 4/2024 | De Francesco .. | G08G 1/096844 |
| 2017/0236413 A1 * | 8/2017 | Takagi ................... | G08G 1/095 |
| | | | 701/117 |
| 2021/0200221 A1 * | 7/2021 | Omari .................... | G06N 20/00 |
| 2023/0054626 A1 * | 2/2023 | Seegmiller ........ | B60W 60/0027 |
| 2024/0053438 A1 * | 2/2024 | Kupershtein ........... | G01S 17/42 |
| 2025/0102626 A1 * | 3/2025 | Monninger .......... | G01S 13/931 |

* cited by examiner

*Primary Examiner* — Kent W Chang
(74) *Attorney, Agent, or Firm* — Banner & Witcoff, Ltd.

(57) ABSTRACT

A vehicle control apparatus and a method thereof are provided. The vehicle apparatus includes light control detection and ranging (LiDAR), a memory, and a processor. The processor generates a virtual meta object, based on receiving information associated with a first plurality of points, identifies whether a converted virtual track and the virtual meta data are associated with each other, based on converting a virtual track into a time point when the virtual meta object is generated, identifies whether there is the virtual meta object, determines whether the virtual track is identified in a first area formed at a distance spaced apart at a first specified distance or more from the front of a vehicle, and activates a function for determining whether to remove at least one virtual box obtained from a second plurality of points, using the virtual track stored in the second space.

20 Claims, 10 Drawing Sheets

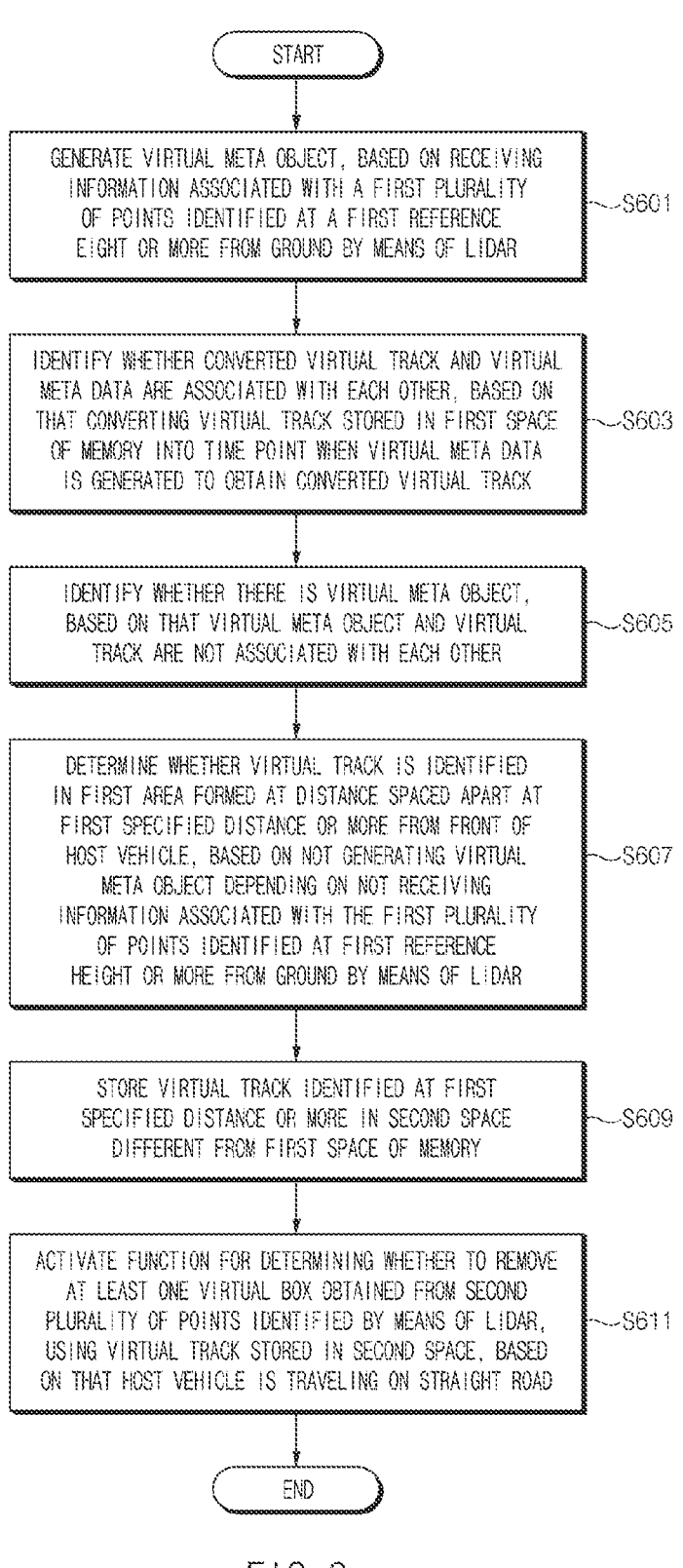

START

GENERATE VIRTUAL META OBJECT, BASED ON RECEIVING
INFORMATION ASSOCIATED WITH A FIRST PLURALITY
OF POINTS IDENTIFIED AT A FIRST REFERENCE
EIGHT OR MORE FROM GROUND BY MEANS OF LIDAR ~S601

IDENTIFY WHETHER CONVERTED VIRTUAL TRACK AND VIRTUAL
META DATA ARE ASSOCIATED WITH EACH OTHER, BASED ON
THAT CONVERTING VIRTUAL TRACK STORED IN FIRST SPACE
OF MEMORY INTO TIME POINT WHEN VIRTUAL META DATA
IS GENERATED TO OBTAIN CONVERTED VIRTUAL TRACK ~S603

IDENTIFY WHETHER THERE IS VIRTUAL META OBJECT,
BASED ON THAT VIRTUAL META OBJECT AND VIRTUAL
TRACK ARE NOT ASSOCIATED WITH EACH OTHER ~S605

DETERMINE WHETHER VIRTUAL TRACK IS IDENTIFIED
IN FIRST AREA FORMED AT DISTANCE SPACED APART AT
FIRST SPECIFIED DISTANCE OR MORE FROM FRONT OF
HOST VEHICLE, BASED ON NOT GENERATING VIRTUAL
META OBJECT DEPENDING ON NOT RECEIVING
INFORMATION ASSOCIATED WITH THE FIRST PLURALITY
OF POINTS IDENTIFIED AT FIRST REFERENCE
HEIGHT OR MORE FROM GROUND BY MEANS OF LIDAR ~S607

STORE VIRTUAL TRACK IDENTIFIED AT FIRST
SPECIFIED DISTANCE OR MORE IN SECOND SPACE
DIFFERENT FROM FIRST SPACE OF MEMORY ~S609

ACTIVATE FUNCTION FOR DETERMINING WHETHER TO REMOVE
AT LEAST ONE VIRTUAL BOX OBTAINED FROM SECOND
PLURALITY OF POINTS IDENTIFIED BY MEANS OF LIDAR,
USING VIRTUAL TRACK STORED IN SECOND SPACE, BASED
ON THAT HOST VEHICLE IS TRAVELING ON STRAIGHT ROAD ~S611

END

FIG.6

VEHICLE CONTROL APPARATUS AND METHOD THEREOF

CROSS-REFERENCE TO RELATED APPLICATION

This application claims the benefit of priority to Korean Patent Application No. 10-2023-0120568, filed in the Korean Intellectual Property Office on Sep. 11, 2023, the entire contents of which are incorporated herein by reference.

TECHNICAL FIELD

The present disclosure relates to a vehicle control apparatus and a method thereof, and more particularly, relates to technologies using one or more sensors (e.g., light detection and ranging (LiDAR) sensors).

BACKGROUND

Accurate detection of an external object using various sensors may be helpful to assist with driving of a vehicle.

Particularly, while the vehicle is operating in a driving assistance device activation mode or an autonomous driving mode, an external object may be identified using one or more sensors, such as one or more LiDAR sensors.

Because of identifying at least one of a position of an external object, a shape of the external object, a speed of the external object, or a type of the external object, or any combination thereof, using light reflected from the external object, when the light reflected from the external object is incorrectly identified, the LiDAR sensor(s) may generate a virtual box corresponding to the external object in a space where there is no external object.

The incorrect detection and the generation of the virtual box may deteriorate the performance of the object identification and autonomous driving operation of the vehicle

SUMMARY

The following summary presents a simplified summary of certain features. The summary is not an extensive overview and is not intended to identify key or critical elements.

An aspect of the present disclosure provides a vehicle control apparatus for removing a virtual box generated by noise and a method thereof.

Another aspect of the present disclosure provides a vehicle control apparatus for identifying noise generated by a road sign or a preceding vehicle and removing a virtual box identified as noise and a method thereof.

Another aspect of the present disclosure provides a vehicle control apparatus for removing a virtual box identified as noise to stably drive a vehicle control system associated with the vehicle control apparatus and a method thereof.

The technical problems to be solved by the present disclosure are not limited to the aforementioned problems, and any other technical problems not mentioned herein will be clearly understood from the following description by those skilled in the art to which the present disclosure pertains.

A vehicle control apparatus may comprise: at least one sensor; a memory; and a processor, wherein the processor is configured to: generate, based on receiving information associated with a first plurality of points of an object, a virtual meta object, wherein the first plurality of points are identified by a detection result of the at least one sensor and positioned above a first reference height; determine whether a converted virtual track is associated with the virtual meta object, wherein a virtual track stored in a first space of the memory is converted into the converted virtual track corresponding to a time point when the virtual meta object is generated; determine whether an existence of the virtual meta object is valid, based on a determination that the virtual meta object and the converted virtual track are not associated with each other; determine whether a virtual track is identified in a first area formed at a distance spaced apart from a vehicle, based on not generating the virtual meta object and not receiving the information, wherein the distance is greater than a first distance; store the virtual track identified in the first area in a second space different from the first space of the memory; and determine whether to remove at least one virtual box obtained from a second plurality of points identified by a detection result of the at least one sensor, using the virtual track stored in the second space, wherein the virtual meta object comprises a closed boundary which is formed by the first plurality of points, wherein the first plurality of points corresponds to the object that comprises a road sign, and wherein the virtual track comprises a second closed boundary formed by a third plurality of points obtained at a time point different from the time point when the virtual meta object is generated, and wherein the second closed boundary corresponds to the object.

The processor may be configured to: determine whether the virtual meta object and the converted virtual track are associated with each other, based on at least one of a distance between a first center point of the virtual meta object and a second center point of the converted virtual track or a rate at which the virtual meta object and the converted virtual track overlap with each other, or any combination thereof.

The processor is configured to: overwrite the virtual track stored in the first space of the memory with the virtual meta object, based on a determination that the virtual meta object and the converted virtual track are associated with each other.

The processor is configured to: determine that the virtual meta object and the converted virtual track are not associated with each other; and generate a second virtual track different from the converted virtual track which is a first virtual track, using the virtual meta object, based on a determination that an existence of the virtual meta object is valid.

The processor is configured to: delete the virtual track stored in the memory, based on a determination that the vehicle is driving on a road which is different from a straight road and includes at least one of curvature or a gradient, or any combination thereof.

The processor is configured to: delete the virtual track stored in the memory, based on a determination that at least one of vertices forming the virtual track is identified, in a second area formed at less than the first distance from the vehicle.

The processor is configured to: determine whether to remove the at least one virtual box obtained by a detection result of the at least one sensor, using the virtual track, based on a determination that at least one of vertices forming the virtual track is identified, in a third area formed at a second distance from the vehicle, wherein the second distance is greater than the first distance.

The processor is configured to: deactivate a function for determining whether to remove the virtual track identified by a detection result of the at least one sensor, based on all the vertices forming the virtual track being identified, in a fourth area spaced apart from the vehicle with a distance greater than the second distance.

The processor is configured to: determine whether to remove the at least one virtual box, based on at least one of a determination whether an existence of the virtual meta object is valid, a shape formed by the second plurality of points included in the at least one virtual box, a width of the at least one virtual box, a length of the at least one virtual box, or a height of a highest point of the at least one virtual box, or any combination thereof.

The processor is configured to: determine whether the at least one virtual box and the converted virtual track are associated with each other, based on a determination that an existence of the virtual meta object is valid, that the shape formed by the second plurality of points included in the at least one virtual box is a specified shape, that the width of the at least one virtual box is less than a first reference length, that the length of the at least one virtual box is less than the first reference length, and that the height of the highest point of the at least one virtual box is greater than a second reference length from the ground; and delete the at least one virtual box, based on a determination that the at least one virtual box and the converted virtual track are associated with each other.

A vehicle control method may comprise: generating, based on receiving information associated with a first plurality of points of an object, a virtual meta object, wherein the first plurality of points are identified by a detection result of the at least one sensor and positioned above a first reference height; determining whether a converted virtual track is associated with the virtual meta object, wherein a virtual track stored in a first space of a memory is converted into the converted virtual track corresponding to a time point when the virtual meta object is generated; determining whether an existence of the virtual meta object is valid, based on a determination that the virtual meta object and the converted virtual track are not associated with each other; determining whether a virtual track is identified in a first area formed at a distance spaced apart from a vehicle, based on not generating the virtual meta object and not receiving the information, wherein the distance is greater than a first distance; storing the virtual track identified in the first area in a second space different from the first space of the memory; and determining whether to remove at least one virtual box obtained from a second plurality of points identified by a detection result of the at least one sensor, using the virtual track stored in the second space, wherein the virtual meta object comprises a closed boundary which is formed by the first plurality of points, wherein the first plurality of points corresponds to the object that comprises a road sign, and wherein the virtual track comprises a second closed boundary formed by a third plurality of points obtained at a time point different from the time point when the virtual meta object is generated, and wherein the second closed boundary corresponds to the object.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings:

FIG. 6 illustrates an example of a flowchart of a vehicle control method; and

DETAILED DESCRIPTION

Figure 1:
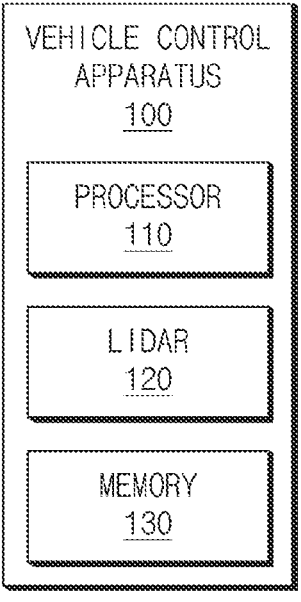
FIG. 1 illustrates an example of a block diagram of a vehicle control apparatus.

Hereinafter, various examples of the present disclosure will be described in detail with reference to the exemplary drawings. In the drawings, the same reference numerals will be used throughout to designate the same or equivalent components. In addition, a detailed description of well-known features or functions will be ruled out in order not to unnecessarily obscure the gist of the present disclosure.

In describing components of exemplary embodiment(s) of the present disclosure, the terms first, second, A, B, (a), (b), and the like may be used herein. These terms are only used to distinguish one component from another component, but do not limit the corresponding components irrespective of the order or priority of the corresponding components. Furthermore, unless otherwise defined, all terms including technical and scientific terms used herein are to be interpreted as is customary in the art to which this present disclosure belongs. It will be understood that terms used herein should be interpreted as having a meaning that is consistent with their meaning in the context of this present disclosure and the relevant art and will not be interpreted in an idealized or overly formal sense unless expressly so defined herein.

Hereinafter, examples of the present disclosure will be described in detail with reference to FIGS. 1 to 7.

FIG. 1 illustrates an example of a block diagram of a vehicle control apparatus.

Referring to FIG. 1, a vehicle control apparatus 100 may be implemented inside or outside a vehicle, and some of components included in the vehicle control apparatus 100 may be implemented inside or outside the vehicle. In this case, the vehicle control apparatus 100 may be integrally configured with control units in the vehicle or may be implemented as a separate device to be connected with the control units of the vehicle by one or more separate connectors and/or one or more communication interfaces. For example, the vehicle control apparatus 100 may further include components which are not shown in FIG. 1.

Referring to FIG. 1, the vehicle control apparatus 100 may include a processor 110, one or more sensors (e.g., LiDAR 120), and a memory 130. The processor 110, the one or more sensors (e.g., the LiDAR 120), and the memory 130 may be electronically or operably coupled with each other by an electronical component including a communication bus.

Hereinafter, that pieces of hardware are operably coupled with each other may include that a direct connection or an indirect connection between the pieces of hardware is established in a wired or wireless manner, such that second hardware is controlled by first hardware among the pieces of hardware. The different blocks are illustrated, but an embodiment is not limited thereto. Some of the pieces of hardware of FIG. 1 may be included in a single integrated circuit including a system on a chip (SoC). Types of the pieces of hardware included in the vehicle control apparatus 100 and/or the number of the pieces of hardware are/is limited to those shown in FIG. 1. For example, the vehicle control apparatus 100 may include only some of the pieces of hardware shown in FIG. 1.

The vehicle control apparatus 100 may include hardware for processing data based on one or more instructions. For example, the hardware for processing the data may include an arithmetic and logic unit (ALU), a floating point unit (FPU), a field programmable gate array (FPGA), a central processing unit (CPU), and/or an application processor (AP). The processor 110 may have a structure of a single-core processor or may have a structure of a multi-core processor including a dual core, a quad core, a hexa core, or an octa core, etc.

The LiDAR 120 included in the vehicle control apparatus 100 may obtain datasets for identifying one or more objects in a surrounding space around a vehicle having the vehicle control apparatus 100. For example, the LiDAR 120 may identify at least one of a position of the one or more objects, a motion direction of the one or more objects, or a speed of the one or more objects, or any combination thereof, based on a pulse laser signal (or light) emitted from the LiDAR 120 being reflected from the one or more objects to return to the LiDAR 120.

For example, the LiDAR 120 may obtain datasets including a plurality of points in a three-dimensional space (e.g., represented by an x-axis, a y-axis, and a z-axis), based on a pulse laser signal reflected from the one or more objects. For example, the LiDAR 120 may obtain the datasets including the plurality of points in the space (e.g., represented by the x-axis, the y-axis, and the z-axis), based on receiving a pulse laser signal at a specified period.

The processor 110 included in the vehicle control apparatus 100 may emit light from the LiDAR 120 of the vehicle. For example, the LiDAR 120 may receive light emitted from the vehicle and the processor 110 may receive information associated with the received light and/or the coordinates of the one or more objects in the three-dimensional space. For example, the processor 110 may identify at least one of the position of the one or more objects or the speed of the one or more objects, based on a time when the light emitted from the vehicle is transmitted and a time when the light emitted from the vehicle and reflected from the one or more objects is received.

For example, the processor 110 may obtain the datasets including the plurality of points, based on the time when the light emitted from the vehicle is transmitted and the time when the light emitted from the vehicle and reflected from the one or more objects is received. The processor 110 may obtain datasets representing the plurality of points on a three-dimensional (3D) virtual coordinate system including the x-axis, the y-axis, and the z-axis. Each of the plurality of points may be represented by coordinates in the 3D virtual coordinate system (e.g., a vector represented by (x, y, z)).

The memory 130 included in the vehicle control apparatus 100 may include a hardware component for storing data and/or an instruction input and/or output from the processor 110 of the vehicle control apparatus 100.

For example, the memory 130 may include a volatile memory including a random-access memory (RAM) or a non-volatile memory including a read-only memory (ROM). For example, the volatile memory may include at least one of a dynamic RAM (DRAM), a static RAM (SRAM), a cache RAM, or a pseudo SRAM (PSRAM), or any combination thereof. For example, the non-volatile memory may include at least one of a programmable ROM (PROM), an erasable PROM (EPROM), an electrically erasable PROM (EEPROM), a flash memory, a hard disk, a compact disc, a solid state drive (SSD), or an embedded multi-media card (eMMC), or any combination thereof.

The processor 110 of the vehicle control apparatus 100 may receive information associated with a first plurality of points identified at a first reference height (e.g., about 4 m) or more from the ground through the LiDAR 120. For example, the information associated with the first plurality of points identified at the first reference height or more from the ground may be referred to as overhead box information.

The processor 110 may generate a virtual meta object, based on receiving the information associated with the first plurality of points identified at the first reference height or more from the ground through the LiDAR 120.

For example, the virtual meta object may include a closed boundary (e.g., a rectangle), which is formed by the first plurality of points obtained by information generated based on the detection of the LiDAR 120 and corresponds to an external object including a road sign. For example, the virtual meta object may be represented as the rectangle, which is formed by the first plurality of points obtained using the LiDAR 120 and corresponds to the external object including the road sign.

The processor 110 may convert a virtual track stored in a first space of the memory 130 into a converted virtual track corresponding to a time point when the virtual meta object is generated. The processor 110 may identify whether the converted virtual track and the virtual meta object are associated with each other, based on obtaining the converted virtual track. For example, the virtual track may include a rectangle formed by a third plurality of points obtained at a different time point different from the time point when the virtual meta object is generated. For example, the different time point different from the time point when the virtual meta object is generated may include a time point prior to the time point when the virtual meta object is generated. For example, the virtual track may include a virtual box managed as an array in a specified space of the memory 130.

The processor 110 may identify a distance between a first center point of the virtual meta object and a second center point of the converted virtual track. The processor 110 may identify a rate at which the virtual meta object and the converted virtual track overlap with each other.

For example, the processor 110 may determine whether the virtual meta object and the converted virtual track are associated with each other, based on at least one of the distance between the first center point of the virtual meta object and the second center point of the converted virtual track and/or the rate at which the virtual meta object and the converted virtual track overlap with each other.

For example, the processor 110 may determine a correlation distance between the first center point and the second center point, based on the first center point of the virtual meta object and the second center point of the converted virtual track. For example, the processor 110 may identify a Mahalanobis distance between the first center point and the second center point. The Mahalanobis distance may be determined as the distance of the test point from the center of mass divided by the width of the ellipsoid in the direction of the test point. The processor 110 may determine that the virtual meta object and the converted virtual track are associated with each other, based on the correlation distance (or the Mahalanobis distance) between the first center point of the virtual meta object and the second center point of the converted virtual track being less than a reference distance. The processor 110 may determine that the virtual meta object and the converted virtual track are not associated with each other, based on the correlation distance (or the Mahalanobis distance) between the first center point of the virtual meta object and the second center point of the converted virtual track being greater than or equal to the reference distance.

For example, the processor 110 may identify a rate at which the virtual meta object and the converted virtual track overlap with each other. The processor 110 may determine that the virtual meta object and the converted virtual track are associated with each other, based on the rate at which the virtual meta object and the converted virtual track overlap with each other being greater than or equal to a reference rate (e.g., about 25%).

For example, the processor 110 may determine that the virtual meta object and the converted virtual track are not associated with each other, based on the rate at which the virtual meta object and the converted virtual track overlap with each other being less than the reference rate.

For example, the processor 110 may determine whether the virtual meta object and the converted virtual track are associated with each other, based on the distance between the first center point of the virtual meta object and the second center point of the converted virtual track and may determine whether the virtual meta object and the converted virtual track are associated with each other based on the rate at which the virtual meta object and the converted virtual track overlap with each other (e.g., when the virtual meta object and the converted virtual track are not associated with each other).

The processor 110 may determine that the virtual meta object and the converted virtual track are associated with each other. The processor 110 may overwrite the virtual track stored in the first space of the memory 130 with the virtual meta object, based on the determination that the virtual meta object and the converted virtual track are associated with each other.

For example, the processor 110 may overwrite the virtual track stored in the first space of the memory 130 with the virtual meta object, based on the virtual meta object and the converted virtual track being associated with each other, thereby replacing the virtual track stored in the first space with the virtual meta object.

The processor 110 may determine that the virtual meta object and the converted virtual track are not associated with each other. The processor 110 may determine whether there is a virtual meta object, based on identifying that the virtual meta object and the converted virtual track are not associated with each other. The processor 110 may generate a virtual track different from the converted virtual track using the virtual meta object. For example, the processor 110 may generate a second virtual track different from the converted virtual track which is a first virtual track. For example, the processor 110 may store the virtual track in the memory 130, based on converting the virtual meta object into the virtual track.

The processor 110 may determine whether there is a virtual meta object, based on a determination that the virtual meta object and the converted virtual track are not associated with each other. For example, the processor 110 may not generate a virtual meta object based on not receiving the first plurality of points identified at the first reference height or more from the ground.

The processor 110 may determine whether the virtual track is identified in a first area formed at a distance spaced apart at a first specified distance (e.g., 15 m) from the front of the vehicle, based on not generating the virtual meta object depending on not receiving the information associated with the first plurality of points identified at the first reference height or more from the ground.

The processor 110 may store the virtual track identified in the first area in a second space different from the first space of the memory 130. For example, the virtual track stored in the second space may be referred to as a virtual memory track.

While the vehicle is driving on a straight road, the processor 110 may obtain at least one virtual box from a second plurality of points identified using the LiDAR 120. The processor 110 may activate a function for determining whether to remove at least one virtual box obtained from the second plurality of points identified by a detection result of the LiDAR 120, using the virtual track stored in the second space, while the vehicle is driving on the straight road.

The processor 110 may determine that the vehicle is driving on a road which is different from the straight road and includes at least one of curvature or a gradient, or any combination thereof. The processor 110 may delete the virtual track stored in the memory 130, based on a determination that the vehicle is driving on the road which is different from the straight road and includes the at least one of the curvature or the gradient, or the any combination thereof. For example, the road which is different from the straight road and includes the at least one of the curvature or the gradient, or the any combination thereof may be referred to as a ramp section.

The processor 110 may delete the virtual track stored in the memory 130, based on a determination that at least one of vertices forming the virtual track is identified, in a second area formed at less than the first specified distance from the front of the vehicle. For example, the second area may be referred to as an overhead virtual track release range.

The processor 110 may activate the function for determining whether to remove the virtual box obtained by a detection result of the LiDAR 120, using the virtual track, based on a determination that at least one of the vertices forming the virtual track identified, in a third area which is greater than or equal to the first specified distance from the front of the vehicle and is formed at a second specified distance (e.g., 80 m) or less, which is greater than the first specified distance.

For example, the third area may be referred to as an eraser area. For example, the third area may be referred to as a false track removal logic operation range. The processor 110 may delete a false track identified in the third area. For example, the false track may include a virtual box generated by noise. For example, the third area may be included in the first area.

The processor 110 may determine whether to remove the virtual box, based on at least one of whether there is a virtual meta object, a shape formed by the second plurality of points included in the virtual box, a width of the virtual box, a length of the virtual box, or a height of a highest point of the virtual box, or any combination thereof.

For example, the processor 110 may determine that there is the virtual meta object.

For example, the processor 110 may identify whether the shape formed by the second plurality of points included in the virtual box is a specified shape. For example, the processor 110 may identify that the shape formed by the second plurality of points included in the virtual box is the specified shape. For example, the specified shape may include an L-shape between the L-shape and an I-shape.

For example, the processor 110 may identify a width of the virtual box. For example, the processor 110 may identify whether the width of the virtual box is less than a first reference length (e.g., about 1 m).

For example, the processor 110 may identify a length of the virtual box. For example, the processor 110 may identify whether the length of the virtual box is less than the first reference length.

For example, the processor 110 may identify a height of the highest point of the virtual box. For example, the processor 110 may identify whether the height of the highest point of the virtual box is greater than a second reference height (e.g., about 2 m).

For example, the processor 110 may identify that there is the virtual meta object, that the shape formed by the second plurality of points included in the virtual box is the specified shape, that the width of the virtual box is less than the first reference length, that the length of the virtual box is less than the first reference length, and that the height of the highest point of the virtual box is greater than the second reference length from the ground. For, the processor 110 may determine whether the virtual box and the converted virtual track are associated with each other, based on a determination that there is the virtual meta object, that the shape formed by the second plurality of points included in the virtual box is the specified shape, that the width of the virtual box is less than the first reference length, that the length of the virtual box is less than the first reference length, and that the height of the highest point of the virtual box is greater than the second reference length from the ground.

The processor 110 may delete the virtual box, based on a determination that the virtual box and the converted virtual track are associated with each other. For example, the deleted virtual box may be referred to as a false track. For example, the false track may include a virtual box identified by light reflected from a preceding vehicle and a road sign. For example, the false track may include a virtual box identified by light reflected from a road sign.

The processor 110 may deactivate the function for determining whether to remove the virtual box identified by a detection result of the LiDAR 120, based on a determination that all the vertices forming the virtual track are identified, in a fourth area which is greater than the second specified distance from the front of the vehicle. For example, the fourth area may be included in the first area.

As described above, the processor 110 of the vehicle control apparatus 100 may identify a false track, using at least one of the virtual track or the virtual meta object, or any combination thereof. The processor 110 may remove the false track using the at least one of the virtual track or the virtual meta object, or the any combination thereof, thereby improving (e.g., stabilizing) a vehicle control system associated with the vehicle control apparatus 100. For example, a driving path of the vehicle may be changed by the false track or the speed of the vehicle may be rapidly reduced by the false track. However, the processor 110 of the vehicle control apparatus 100 may remove the false track using the at least one of the virtual track or the virtual meta data, or the any combination thereof, thereby preventing the driving path of the vehicle from being changed by the false track or preventing the speed of the vehicle from being rapidly reduced by the false track.

Figure 2A:
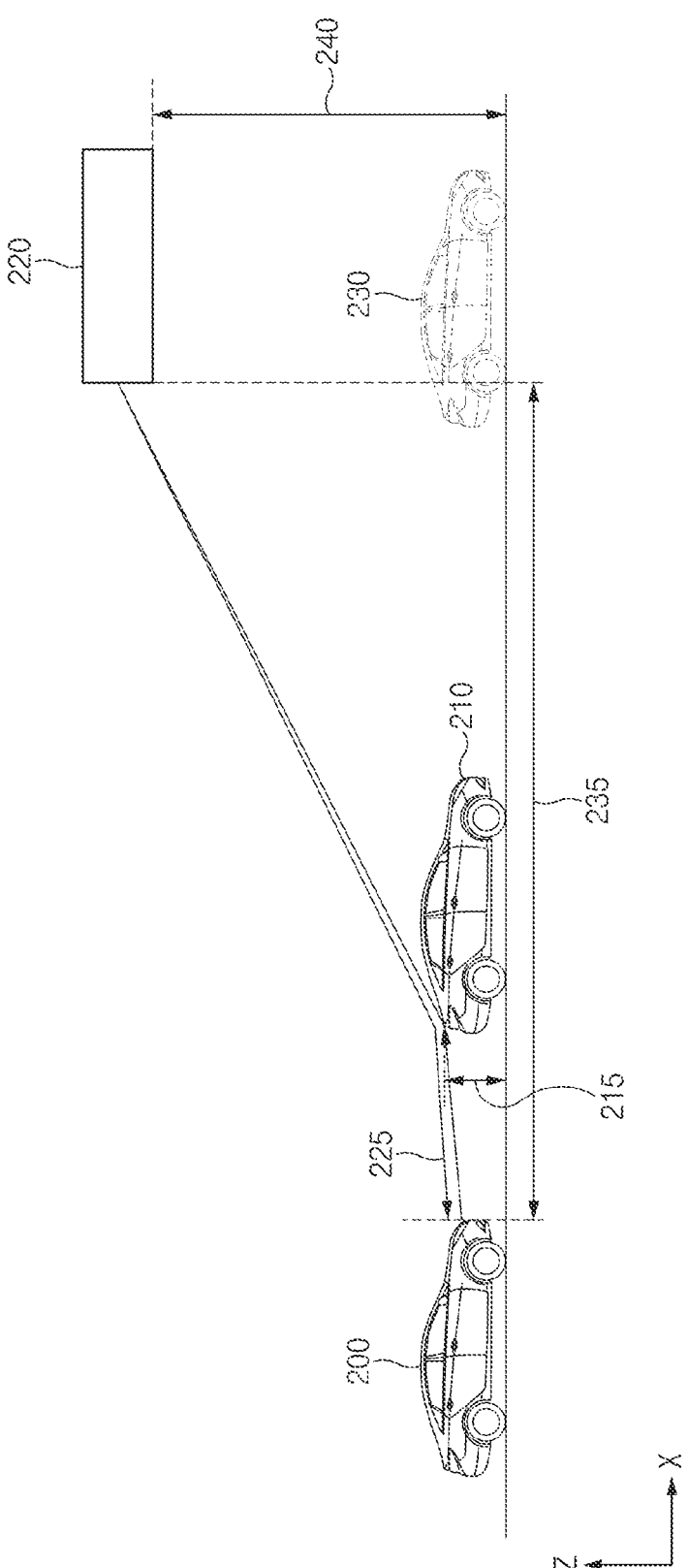
FIG. 2A illustrates an example in which noise is generated by a preceding vehicle different from a vehicle.

FIG. 2A illustrates an example in which noise is generated by a preceding vehicle different from a vehicle.

Figure 2B:
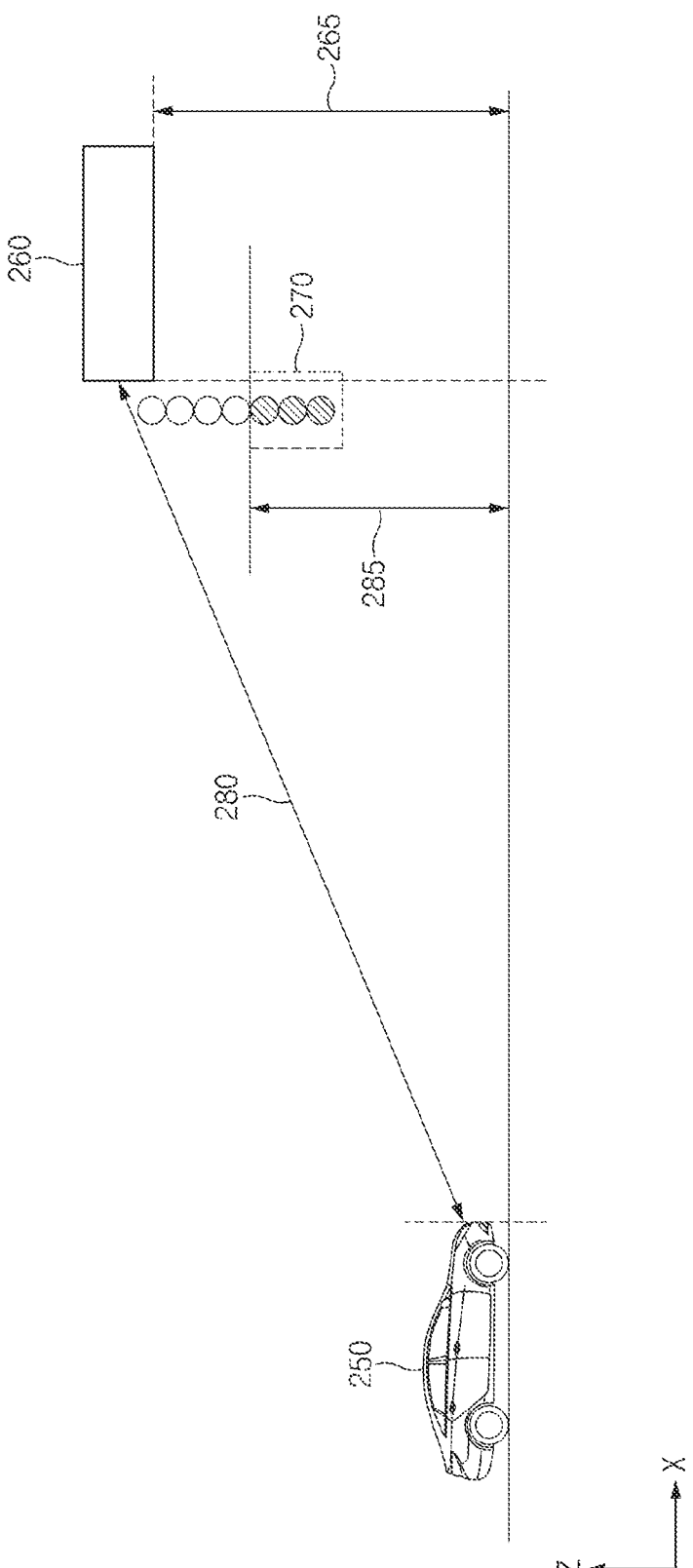
FIG. 2B illustrates an example in which noise is generated by light reflected from a road sign.

FIG. 2B illustrates an example in which noise is generated by light reflected from a road sign.

Operations of a vehicle control apparatus with respect to FIGS. 2A and/or 2B may be performed by a vehicle control apparatus 100 of FIG. 1. For example, the operations of a vehicle control apparatus with respect to FIGS. 2A and 2B may be performed by a processor 110 included in the vehicle control apparatus 100 of FIG. 1.

FIGS. 2A and 2B show examples in which noise is generated by a an object (e.g., a road sign and/or a preceding vehicle).

FIGS. 2A and 2B may include an example of representing vehicles 200 and 250 and one or more objects of the vehicles 200 and 250 on a surface represented by an x-axis and a z-axis among the x-axis, a y-axis, and the z-axis. The x-axis may be in parallel to the driving direction of the vehicle. The z-axis may be a vertical axis perpendicular to the x-axis.

Referring to FIG. 2A, a processor of a vehicle control apparatus may control the LiDAR to emit light from the vehicle 200. The LiDAR may receive light which is reflected from a preceding vehicle 210 and a road sign 220.

FIG. 2A illustrates an example state in which a false track is generated by the light propagation path reflected at the preceding vehicle 210 and the road sign 220, a description thereof will be given below.

For example, the vehicle 200 of FIG. 2A may be equipped with the LiDAR at a height of about 0.6 m from the ground. Light emitted from the LiDAR mounted on the vehicle 200 may be reflected from a rear end of the preceding vehicle 210 and then reflected from the road sign 220. For example, a height 215 of the rear end of the preceding vehicle 210 may be about 1 m. For example, a height 240 of the road sign 220 may be about 5 m. In an example, the road sign 220 may have a distance 235 spaced apart from the vehicle 200 (e.g., which may be about 48 m).

If the light emitted from the LiDAR mounted on the vehicle 200 is reflected from the rear end of the preceding vehicle 210 and then is incident to the road sign 220. For example, it may be emitted at an angle of about 2.1 degrees with respect to the ground.

The LiDAR may receive light traveling along a path 225, which is reflected by the preceding vehicle 210 and the road sign 220 from the vehicle 200.

The processor may identify a plurality of points represented at a height of about 2.36 m, based on receiving the light along the path 225 reflected by the preceding vehicle 210 and the road sign 220 from the vehicle 200.

The processor may output a false track 230, based on the angle of the light emitted from the LiDAR, the distance 235 between the road sign 220 and the vehicle 200 (e.g. based on the traveling time of the light along the path 225), and the mounting height of the LiDAR. For example, the false track 230 may be generated by the plurality of points by the light reflected by the preceding vehicle 210 and the road sign 220. Because the false track 230 is frequently identified as a static object, there is a need to remove the false track 230 to enhance accurate detection of one or more objects in the driving path.

Referring to FIG. 2B, the processor may emit light along a path 280 from the vehicle 250. The LiDAR may receive light reflected from a road sign 260, based on emitting the light along the path 280. A height 265 at which the road sign 260 is installed may be about 5 m.

The processor may identify a false track 270 by the light reflected by the road sign 260. For example, the false track 270 may include a virtual box which does not correspond to an external object. For example, a height 285 at which the false track 270 is identified may be about 3 m or less.

In FIGS. 2A and 2B, the processor needs to remove the false tracks 230 and to provide an accurate object detection result. When the false tracks 230 and 270 are identified, it may cause an error in a vehicle control system associated with the vehicle control apparatus. Hereinafter, a description will be given below of the vehicle control apparatus for removing the false tracks 230 and 270.

Figure 3:
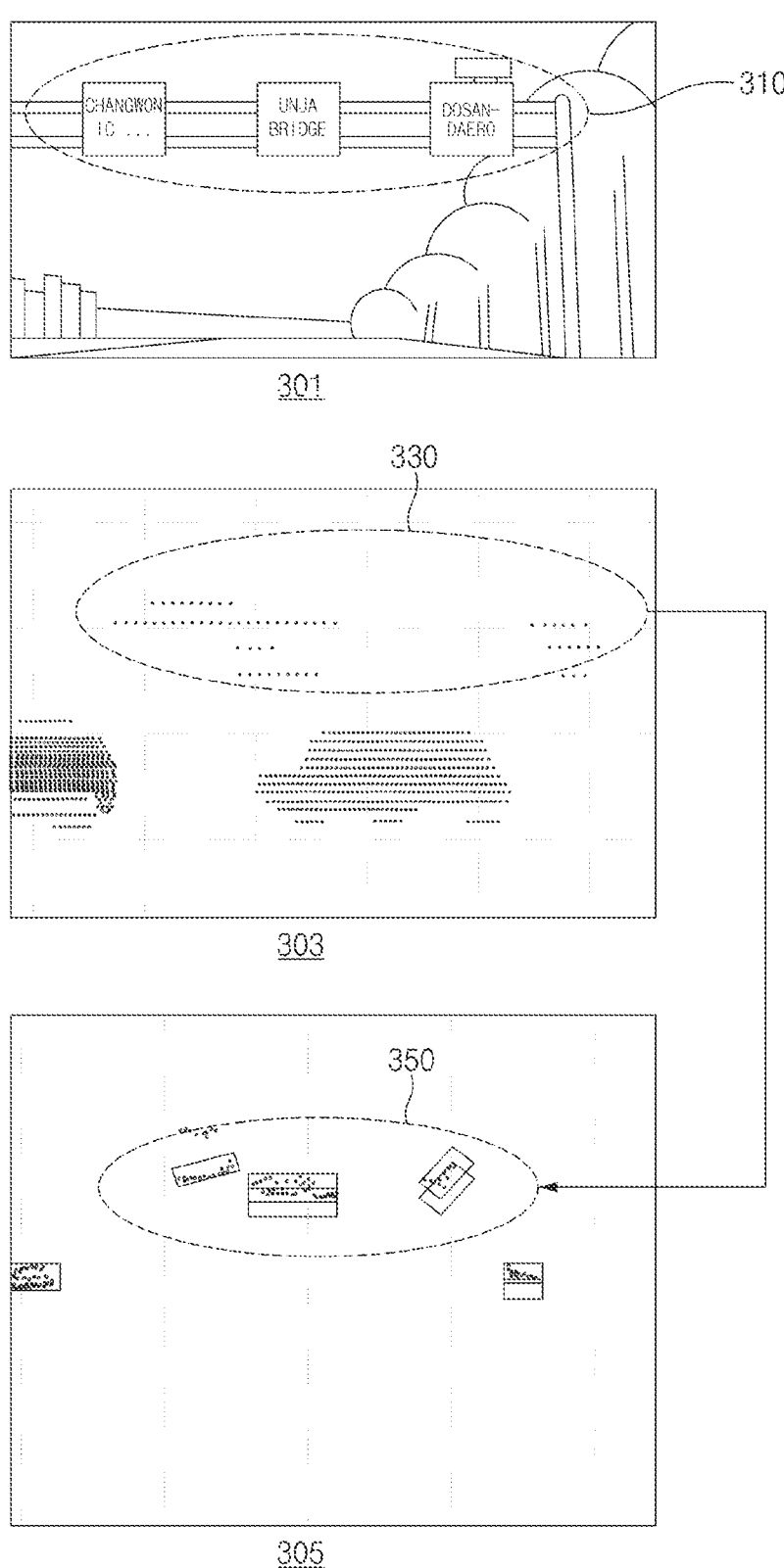
FIG. 3 illustrates an example of an external object and noise represented by LiDAR.

FIG. 3 illustrates an example of an external object and noise represented by LiDAR.

Operations of an apparatus illustrated in FIG. 3 may be performed by a vehicle control apparatus 100 of FIG. 1. For example, the operations of FIG. 3 may be performed by a processor 110 included in the vehicle control apparatus 100 of FIG. 1.

A first example 301 of FIG. 3 may include an example associated with a surrounding environment of a vehicle. A second example of FIG. 3 may include an example in which a plurality of points obtained by LiDAR are represented on a surface formed by a y-axis and a z-axis among an x-axis, the y-axis, and the z-axis (e.g., the x-axis may be in parallel to the driving direction of the vehicle or the direction from the rear center of the vehicle toward the front center of the vehicle, the y-axis may be a horizontal axis perpendicular to the x-axis, and the z-axis may be a vertical axis perpendicular to the x-axis and the y-axis). A third example of FIG. 3 may include an example in which the plurality of points obtained by the LiDAR are represented on a surface formed by the x-axis and the y-axis among the x-axis, the y-axis, and the z-axis.

Referring to FIG. 3, in the first example 301, a processor of a vehicle control apparatus may identify road signs 310. For example, the processor of the vehicle control apparatus may identify a plurality of points and/or virtual boxes corresponding to the road signs 310, based on light emitted from the LiDAR being reflected by the road signs 310 and received by the LiDAR.

The processor may identify a plurality of points and/or virtual boxes by crosstalk noise of the road signs 310, together with the plurality of points and/or the virtual boxes corresponding to the road signs 310. The virtual boxes by the crosstalk noise of the road signs 310 may be referred to a false track.

The second example 303 may include an example of a plurality of points 330 by the crosstalk noise of the road signs 310 of the first example 301. For example, the processor may obtain virtual boxes 350, based on the plurality of points 330.

In the third example 305, the virtual boxes 350 may include virtual boxes corresponding to an external object and virtual boxes generated by noise. Because the virtual boxes generated by the noise among the virtual boxes 350 are frequently identified as static objects, the vehicle control apparatus needs to remove the virtual boxes generated by the noise.

Figure 4:
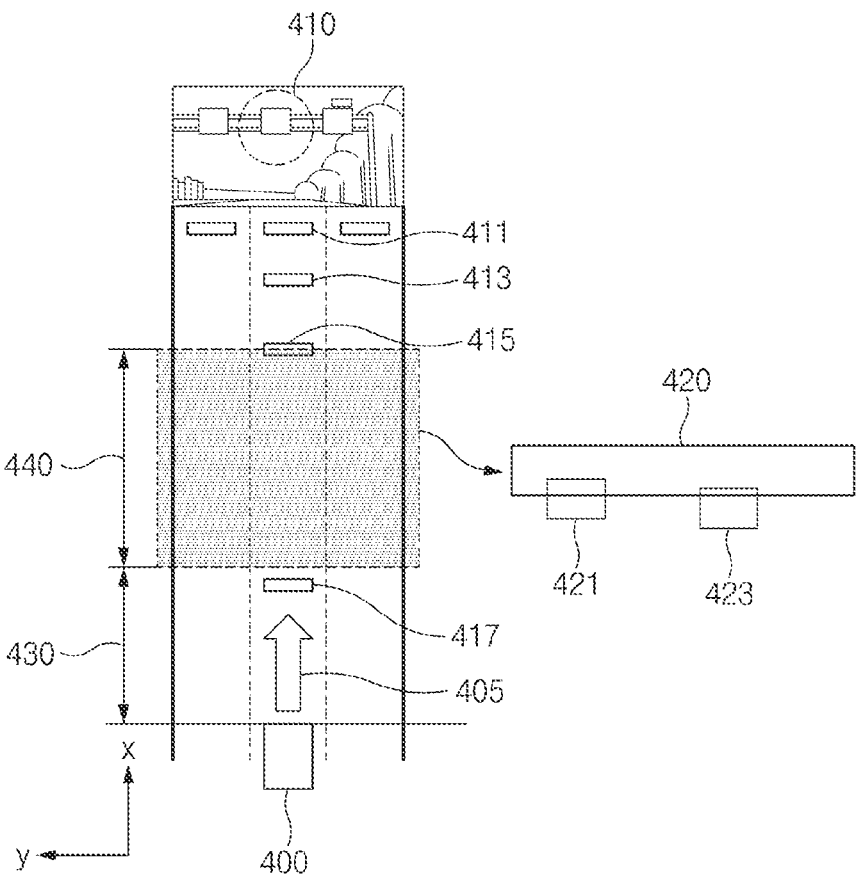
FIG. 4 illustrates an example of removing virtual boxes by a vehicle control apparatus.

FIG. 4 illustrates an example of removing virtual boxes by a vehicle control apparatus.

Operations of an apparatus illustrated with respect to FIG. 4 may be performed by a vehicle control apparatus 100 of FIG. 1. For example, the operations illustrated with respect to FIG. 4 may be performed by a processor 110 included in the vehicle control apparatus 100 of FIG. 1.

Referring to FIG. 4, while a vehicle 400 is driving, a processor of a vehicle control apparatus may obtain a plurality of points and/or virtual boxes, based on light reflected from an external object by a detection result of a LiDAR device. Hereinafter, the virtual boxes and/or the virtual box may include a virtual track and/or a virtual meta object.

For example, when the vehicle 400 is driving, the processor may obtain a virtual box 411 corresponding to a road sign 410, based on receiving light reflected from the road sign 410. For example, the processor may use the virtual box 411 corresponding to the road sign 410 as a virtual meta object and/or a virtual track. For example, the virtual meta object may include the virtual meta object described with reference to FIG. 1. For example, the virtual track may include the virtual track described with reference to FIG. 1.

The processor may identify that the vehicle 400 changes in position on a surface formed by an x-axis and a y-axis among the x-axis, the y-axis, and a z-axis. For example, the processor may identify that the vehicle 400 is driving in a positive direction 405 of the x-axis. While the vehicle 400 is driving in the positive direction 405 of the x-axis, the processor may identify that virtual boxes 411, 413, 415, and 417 corresponding to the road sign 410 move.

While the virtual boxes 411, 413, 415, and 417 corresponding to the road sign 410 moves, the processor may identify noise (e.g., a false track) generated by the road sign 410. The processor may activate or deactivate a function for removing noise generated by the road sign 410, depending on positions at which the virtual boxes 411, 413, 415, and 417 are identified.

The processor may identify a first area formed at a distance spaced apart at a first specified distance (e.g., about 15 m) or more from the front of the vehicle 400.

The processor may identify a second area 430 formed at a distance spaced apart at less than the first specified distance from the front of the vehicle 400. For example, when virtual boxes are identified in the second area 430, the processor may allocate an identifier including "ActivateEraser=0".

The processor may identify a third area 440 which is greater than or equal to the first specified distance from the front of the vehicle 400 and is formed at a second specified distance (e.g., about 80 m) or less, which is greater than the first specified distance. For example, the first area may include the third area 440. For example, when virtual boxes are identified in the third area 440, the processor may allocate an identifier including "ActivateEraser=1".

The processor may generate the virtual box 411 corresponding to the road sign 410. The processor may store the virtual box 411 corresponding to the road sign 410 in a memory. The processor may use the stored virtual box 411 as data for tracking an external object (e.g., the road sign 410). The data for tracking the external object may be referred to as a virtual track. Hereinafter, a virtual box tracked while the virtual box 411 changes in position, as the vehicle 400 moves, is referred to as a virtual track.

The processor may identify the virtual track 417 in the second area 430. The processor may identify at least a portion of the virtual track 417 in the second area 430. For example, the processor may remove the virtual track 417, based on identifying at least one of vertices of the virtual track 417 in the second area 430. For example, the processor may remove the virtual track 417 stored in the memory, based on identifying at least one of the vertices of the virtual track 417 in the second area 430.

The processor may identify the virtual track 415, at least a portion of which is included in the third area 440. The processor may activate a function for removing a false track, based on identifying the virtual track 415, the at least a portion of which is included in the third area 440. For example, the false track may be generated by light reflected by a preceding vehicle and/or a road sign.

If the at least a portion of the virtual track 415 in the third area 440 is not identified, the processor may deactivate the function for removing the false track.

Hereinafter, a description will be given of the function for removing the false track.

The processor may identify the virtual track 420 in the third area 440. The processor may identify virtual boxes 421 and 423 in the third area 440, based on identifying the virtual track 420 in the third area 440.

The processor may identify whether the virtual track 420 and the virtual boxes 421 and 423, which are identified in the third area 440, are associated with each other. For example, the processor may identify whether the virtual track 420 and each of the virtual boxes 421 and 423 overlap with each other at a specified rate (e.g., about 25%) or more. For example, the processor may identify a correlation distance between a center point of the virtual track 420 and a center point of each of the virtual boxes 421 and 423. The processor may identify the correlation distance between the center point of the virtual track 420 and the center point of each of the virtual boxes 421 and 423 is greater than a specified distance. For example, the correlation distance may include a Mahalanobis distance.

The processor may identify that the virtual track 420 and each of the virtual boxes 421 and 423 are associated with each other, based on a determination that the virtual track 420 and each of the virtual boxes 421 and 423 overlap with each other at the specified rate or more. The processor may remove the virtual boxes 421 and 423, based on that the virtual track 420 and each of the virtual boxes 421 and 423 are associated with each other. For example, the processor may remove the virtual boxes 421 and 423 and may output the removed result.

The processor may identify that the virtual track 420 and each of the virtual boxes 421 and 423 are associated with each other, based on a determination that the correlation distance between the center point of the virtual track 420 and the center point of each of the virtual boxes 421 and 423 is less than the specified distance. The processor may remove the virtual boxes 421 and 423, based on that the virtual track 420 and each of the virtual boxes 421 and 423 are associated with each other. The processor may remove the virtual boxes 421 and 423 and may output the removed result.

The processor may identify that the virtual track 420 and each of the virtual boxes 421 and 423 are not associated with each other, based on a determination that the virtual track 420 and each of the virtual boxes 421 and 423 overlap with each other at less than the specified rate. The processor may maintain the virtual boxes 421 and 423, based on that the virtual track 420 and each of the virtual boxes 421 and 423 are not associated with each other. The processor may output the result of maintaining the virtual boxes 421 and 423. The processor may output information associated with an external object corresponding to each of the virtual boxes 421 and 423 together with each of the virtual boxes 421 and 423 by outputting the result of maintaining the virtual boxes 421 and 423.

The processor may identify that the virtual track 420 and each of the virtual boxes 421 and 423 are not associated with each other, based on a determination that the correlation distance between the center point of the virtual track 420 and the center point of each of the virtual boxes 421 and 423 is greater than or equal to the specified distance. The processor may maintain the virtual boxes 421 and 423 based on a determination that the virtual track 420 and each of the virtual boxes 421 and 423 are not associated with each other. The processor may output the result of maintaining the virtual boxes 421 and 423. The processor may output the information associated with the external object corresponding to each of the virtual boxes 421 and 423 together with each of the virtual boxes 421 and 423 by outputting the result of maintaining the virtual boxes 421 and 423.

For example, the information associated with the external object corresponding to each of the virtual boxes 421 and 423 may include at least one of a speed of the external object, a type of the external object, or a state (e.g., a static state and/or a moving state) of the external object, or any combination thereof.

As described above, the processor may remove or maintain the virtual boxes 421 and 423, based on the function for removing the virtual boxes 421 and 423 (e.g., false tracks) identified in the specified area (e.g., the third area 440). The processor may remove or maintain the virtual boxes 421 and 423, based on executing the function for removing the virtual boxes 421 and 423, thereby providing assistance in driving the vehicle 400 in a vehicle control system associated with the vehicle control apparatus. For example, the processor may remove a false track, thereby providing assistance in maintaining an operation path of the vehicle 400 or maintaining a speed.

Figure 5A:
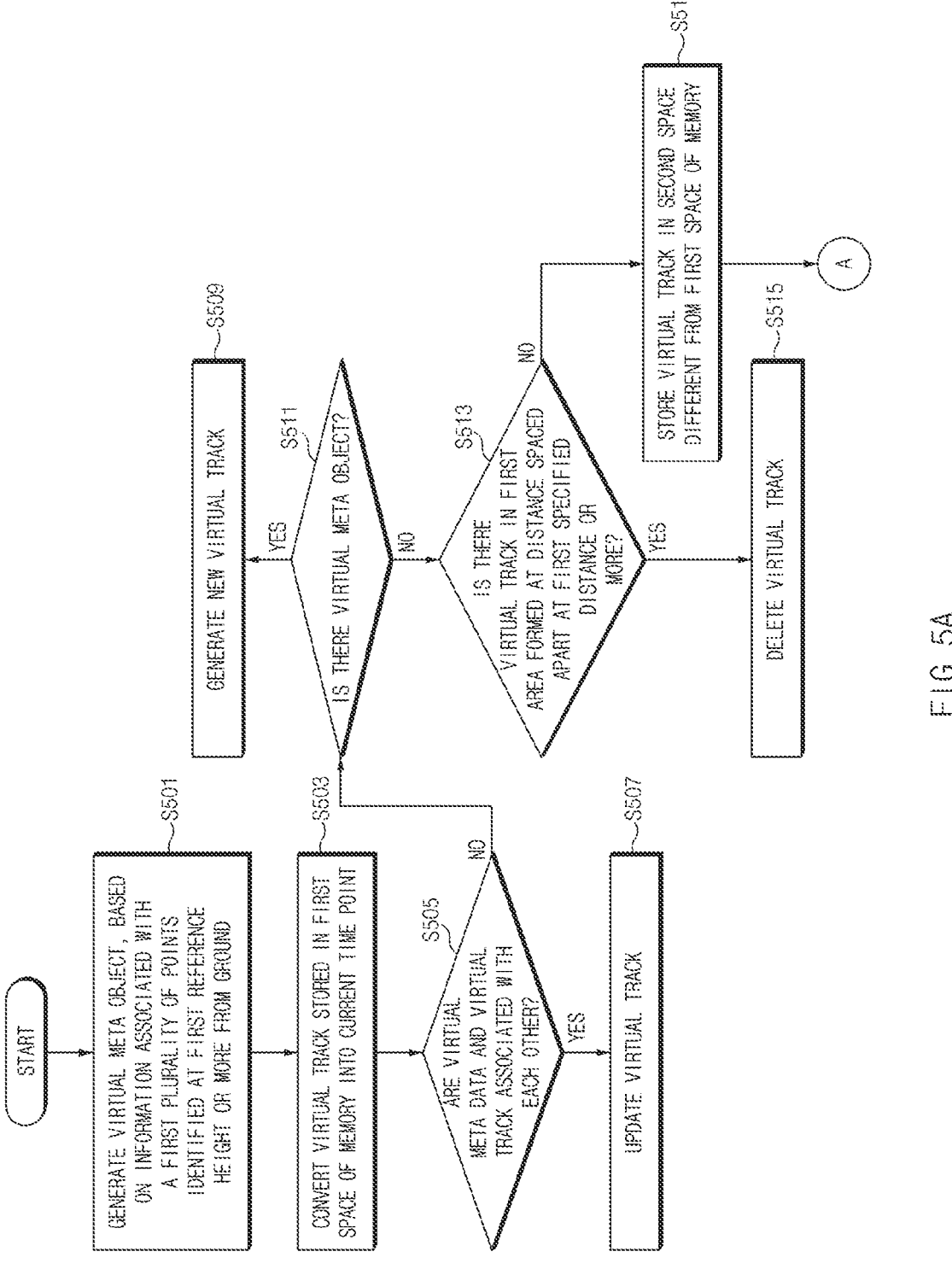
FIG. 5A illustrates an example of a flowchart of a vehicle control method.

FIG. 5A illustrates an example of a flowchart of a vehicle control method.

Figure 5B:
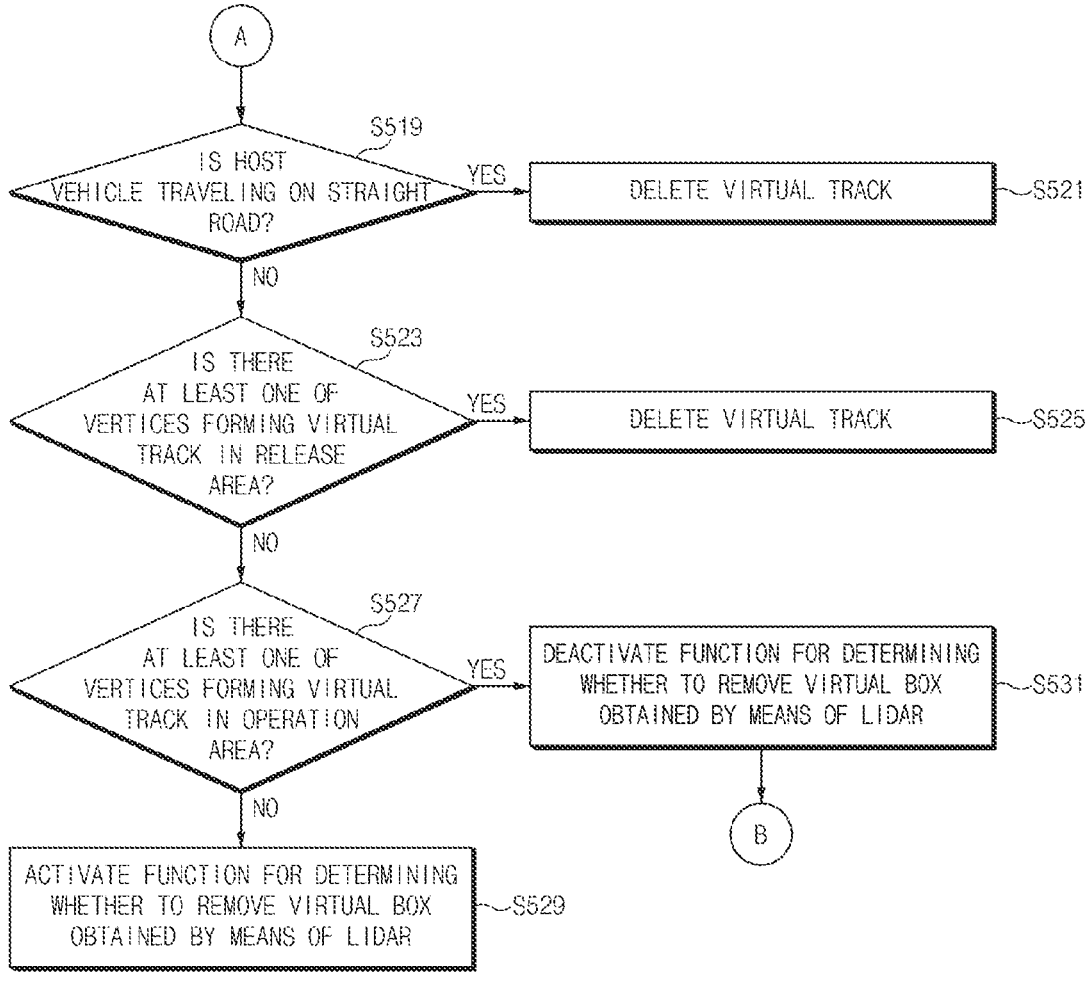
FIG. 5B illustrates an example of a flowchart of a vehicle control method.

FIG. 5B illustrates an example of a flowchart of a vehicle control method.

Figure 5C:
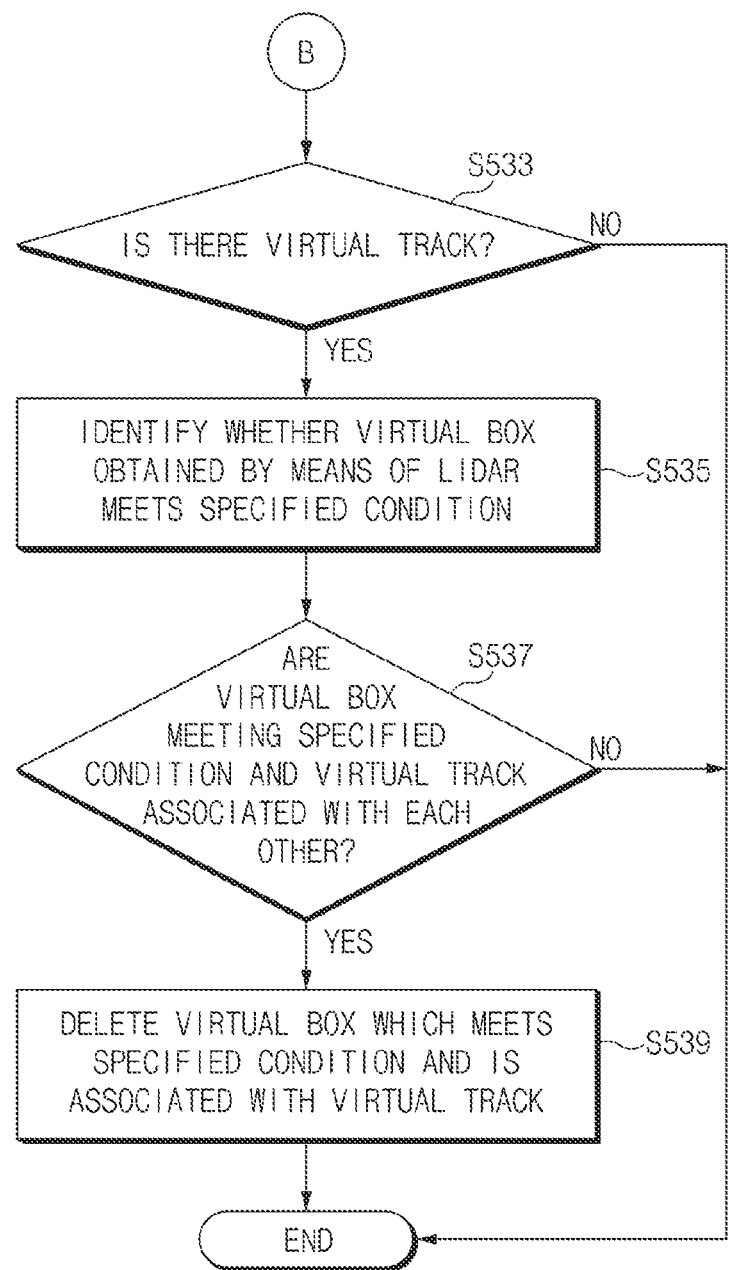
FIG. 5C illustrates an example of a flowchart of a vehicle control method.

FIG. 5C illustrates an example of a flowchart of a vehicle control method.

Operations of an apparatus illustrated with respect to FIGS. 5A to 5C may be performed by a vehicle control apparatus 100 of FIG. 1. For example, the operations illustrated with respect to FIGS. 5A to 5C may be performed by a processor 110 included in the vehicle control apparatus 100 of FIG. 1.

At least one of the operations illustrated with respect to FIGS. 5A to 5C may be performed by the vehicle control apparatus 100 of FIG. 1. The respective operations illustrated with respect to FIGS. 5A to 5C may be sequentially performed, but are not necessarily sequentially performed. For example, an order of the respective operations may be changed, and at least two operations may be performed in parallel.

Referring to FIG. 5A, in S501, the vehicle control method may include generating a virtual meta object, based on information associated with a first plurality of points identified at a first reference height or more from the ground.

For example, the virtual meta object may include a rectangle which is formed by the first plurality of points obtained by means of LiDAR and corresponds to an external object including a road sign.

In S503, the vehicle control method may include converting a virtual track stored in a first space of a memory into a current time point. For example, the virtual track may include a rectangle formed by a third plurality of points obtained at a time point different from the time point when the virtual meta object is generated.

In S505, the vehicle control method may include identifying whether the virtual meta object and the virtual track are associated with each other. For example, the vehicle control method may include identifying whether the virtual meta object and the virtual track are associated with each other, based on at least one of a degree to which the virtual meta object and the virtual track overlap with each other or a correlation distance between a center point of the virtual track and a center point of the virtual meta object, or any combination thereof.

When the virtual meta object and the virtual track are associated with each other (YES of S505), in S507, the vehicle control method may include updating the virtual track, based on that the virtual meta object and the virtual track are associated with each other. For example, the updating of the virtual track may include replacing the virtual track stored in the first space of the memory with the virtual meta object. For example, the updating of the virtual track may include overwriting the virtual track stored in the first space of the memory with the virtual meta object.

When the virtual meta object and the virtual track are not associated with each other (NO of S505), in S511, the vehicle control method may include identifying whether there is a virtual meta object. For example, the virtual meta object may include a virtual box corresponding to an external object identified at a current time point.

If there is the virtual meta object (YES of S511), in S509, the vehicle control method may include generating a new virtual track. For example, the generating of the new virtual track may include generating a virtual track corresponding to the virtual meta object. For example, the vehicle control method may include generating the virtual track corresponding to the virtual meta object and storing and managing the virtual track in a space different from the first space of the memory.

For example, the generating of the new virtual track may include generating a virtual track for tracking a new external object.

If there is no virtual meta object (NO of S511), in S513, the vehicle control method may include identifying whether there is the virtual track in a first area formed at a distance spaced apart at a first specified distance (e.g., about 15 m) or more. For example, the vehicle control method may include identifying whether there is the virtual track in the first area formed at the distance spaced apart at the first specified distance or more from a vehicle.

If there is the virtual track in the first area formed at the distance spaced apart at the first specified distance or more (YES—S513), in S515, the vehicle control method may include deleting the virtual track. For example, the vehicle control method may include deleting the virtual track stored in the first space of the memory.

If there is no virtual track in the first area formed at the distance spaced apart at the first specified distance or more (NO of S513), in S517, the vehicle control method may include storing the virtual track in a second space different from the first space of the memory. For example, the storing of the virtual track in the second space different from the first space of the memory may include forming a virtual memory track and managing the virtual track.

Referring to FIG. 5B, in S519, the vehicle control method may include identifying whether the vehicle is traveling on a straight road.

For example, a road different from the straight road may be referred to as a ramp section.

If the vehicle is driving on the straight road (YES of S519), in S521, the vehicle control method may include deleting the virtual track. For example, the vehicle control method may include deleting the virtual track stored in the memory. For example, the vehicle control method may include deleting the virtual memory track stored in the memory. For example, the vehicle control method may include deleting all of datasets associated with the virtual track stored in the memory.

If the vehicle is not traveling on the straight road (NO of S519), in S523, the vehicle control method may include identifying whether there is at least one of vertices forming the virtual track in a release area. For example, the release area may include an area formed within the first specified distance (e.g., about 15 m) from the front of the vehicle.

If there is the at least one of the vertices forming the virtual track in the release area (YES of S523), in S525, the vehicle control method may include deleting the virtual track. For example, the vehicle control method may include deleting the virtual track stored in the first space of the memory.

If there is no at least one of the vertices forming the virtual track in the release area (NO of S523), in S527, the vehicle control method may identify whether there is at least one of the vertices forming the virtual track in an operation area.

For example, the operation area may include an area which is greater than or equal to the first specified distance from the front of the vehicle and is formed at a second specified distance or less, which is greater than the first specified distance.

If there is no at least one of the vertices forming the virtual track in the operation area (NO of S527), in S529, the vehicle control method may include deactivating a function for determining whether to remove the virtual box obtained by a detection result of the LiDAR.

If there is the at least one of the vertices forming in the virtual track in the operation area (YES of S527), in S531, the vehicle control method may include activating the function for determining whether to remove the virtual box obtained by a detection result of the LiDAR. For example, the function for determining whether to remove the virtual box obtained by a detection result of the LiDAR may be referred to as a false track removal function.

Referring to FIG. 5C, in S533, the vehicle control method may include identifying whether there is a virtual track. For example, the vehicle control method may include identifying whether there is a virtual track in the memory. For example, the vehicle control method may include identifying whether there is a virtual track in a specified space (e.g., a first space and/or a second space) in the memory.

If there is the virtual track (YES of S533), in S535, the vehicle control method may include identifying whether the virtual box obtained by a detection result of the LiDAR meets a specified condition.

For example, the specified condition may be associated with at least one of whether there is at least one virtual box, a shape formed by a second plurality of points included in the at least one virtual box, a height of a highest point of the at least one virtual box, a width of the at least one virtual box, or a length of the at least one virtual box, or any combination thereof.

For example, the specified condition being met may include a condition when there is the at least one virtual box, a condition when the shape formed by the second plurality of points included in the at least one virtual box is a specified shape, a condition when the height of the highest point of the at least one virtual box is greater than a reference height (e.g., about 2 m), a condition when the width of the at least one virtual box is less than a reference width (e.g., about 1 m), and a condition when the length of the at least one virtual box is less than a reference length (e.g., about 1 m). For example, the specified shape may include an L-shape between the L-shape and an I-shape. For example, the L-shape may include when the second plurality of points included in the at least one virtual box are arranged in the shape of "L".

For example, the specified condition being not met may include a condition when there is no at least one virtual box, a condition when the shape formed by the second plurality of points included in the at least one virtual box is not the specified shape, a condition when the height of the highest point of the at least one virtual box is less than or equal to the reference height, a condition when the width of the at least one virtual box is greater than or equal to the reference width, or a condition when the length of the at least one virtual box is greater than or equal to the reference length.

The at least one virtual box which meets all the above-mentioned specified conditions may be selected as a candidate of the false track. For example, the vehicle control method may include removing all or some of virtual boxes selected as candidates of the false track.

In S537, the vehicle control method may include identifying whether the virtual box meeting the specified condition and the virtual track are associated with each other.

For example, the vehicle control method may include identifying whether the virtual box and the virtual track are associated with each other, based on at least one of a rate at which the virtual box and the virtual track overlap with each other or a distance between a center point of the virtual box and a center point of the virtual track, or any combination thereof.

For example, the vehicle control method may include identifying that the virtual box and the virtual track are associated with each other, based on a determination that the virtual box and the virtual track overlap with each other at a specified rate (e.g., about 25%) or more.

For example, the vehicle control method may include identifying that the virtual box and the virtual track are associated with each other, based on a determination that the correlation distance between the center point of the virtual box and the center point of the virtual track is less than a reference length.

For example, the vehicle control method may include identifying that the virtual box and the virtual track are not associated with each other, based on a determination that the virtual box and the virtual track overlap with each other at less than the specified rate.

For example, the vehicle control method may include identifying that the virtual box and the virtual track are not associated with each other, based on a determination that the correlation distance between the virtual box and the virtual track is greater than or equal to the reference length.

For example, the vehicle control method may include identifying the correlation distance between the center point of the virtual box and the center point of the virtual track, based on a determination that the virtual box and the virtual track overlap with each other at less than the specified rate.

If it is determined that the virtual track and all or some of virtual boxes selected as false track candidates are associated with each other, because the all or the some of the virtual boxes selected as the false track candidates associated with the virtual track are false tracks, the vehicle control method (or the vehicle control apparatus) may include deleting the false virtual track and the all or some of the virtual boxes selected as the false track candidates.

The vehicle control method may be to select the false track candidate and remove the false track, depending on whether the selected false track and the virtual track are associated with each other, thus providing assistance in driving the vehicle.

FIG. 6 illustrates an example of a flowchart of a vehicle control method.

Operations of an apparatus illustrated in FIG. 6 may be performed by a vehicle control apparatus 100 of FIG. 1. For example, the operations illustrated in FIG. 6 may be performed by a processor 110 included in the vehicle control apparatus 100 of FIG. 1.

At least one of the operations illustrated in FIG. 6 may be performed by the vehicle control apparatus 100 of FIG. 1. The respective operations of FIG. 6 may be sequentially performed, but are not necessarily sequentially performed. For example, an order of the respective operations may be changed, and at least two operations may be performed in parallel.

Referring to FIG. 6, in S601, the vehicle control method may include generating a virtual meta object, based on receiving information associated with a first plurality of points identified at a first reference height or more from the ground by means of LiDAR.

For example, the virtual meta object may include a virtual box which is formed by the first plurality of points obtained by a detection result of the LiDAR and corresponds to an external object including a road sign.

In S603, the vehicle control method may include identifying whether a converted virtual track and the virtual meta data are associated with each other, based on a determination that converting a virtual track stored in a first space of a memory into a time point when the virtual meta data is generated to obtain the converted virtual track.

For example, the virtual track may include a rectangle formed by a third plurality of points obtained at a time point different from the time point when the virtual meta object is generated.

For example, the vehicle control method may include identifying whether the virtual meta object and the converted virtual track are associated with each other, based on at least one of a distance between a first center point of the virtual meta object and a second center point of the converted virtual track or a rate at which the virtual meta object and the converted virtual track overlap with each other, or any combination thereof.

The vehicle control method may include overwriting the virtual track stored in the first space of the memory with the virtual meta object, based on a determination that the virtual meta object and the converted virtual track are associated with each other.

In S605, the vehicle control method may include identifying whether there is a virtual meta object, based on a determination that the virtual meta object and the virtual track are not associated with each other.

The vehicle control method may include identifying whether the virtual meta object and the converted virtual track are not associated with each other. The vehicle control method may include generating a second virtual track different from the converted virtual track which is a first virtual track using the virtual meta object, based on identifying that the virtual meta object and the converted virtual track are not associated with each other and that there is the virtual meta object.

In S607, the vehicle control the method may include determining whether the virtual track is identified in a first area formed at a distance spaced apart at a first specified distance or more from the front of the vehicle, based on not generating the virtual meta object depending on not receiving the information associated with the first plurality of points identified at the first reference height or more from the ground by a detection result of the LiDAR.

In S609, the vehicle control method may store the virtual track identified at the first specified distance or more in a second space different from the first space of the memory.

The vehicle control method may include deleting the virtual track stored in the memory, based on a determination that the vehicle is traveling on a road which is different from the straight road and includes at least one of curvature or a gradient, or any combination thereof.

In S611, the vehicle control method may include activating a function for determining whether to remove at least one virtual box obtained from a second plurality of points by a detection result of the LiDAR, using the virtual track stored in the second space, based on a determination that the vehicle is traveling on the straight road.

The vehicle control method may include deleting the virtual track stored in the memory, based on a determination that at least one of vertices forming the virtual track is identified, in a second area formed at less than the first specified distance from the front of the vehicle.

The vehicle control method may include activating the function for determining whether to remove the virtual box obtained by means of the LiDAR, using the virtual track, based on a determination that at least one of the vertices forming the virtual track is identified, in a third area which is greater than or equal to the first specified distance from the front of the vehicle and is formed at a second specified distance or less, which is greater than the first specified distance.

The vehicle control method may include deactivating the function for determining whether to remove the virtual box identified by a detection result of the LiDAR, based on a determination that all the vertices forming the virtual track are identified, in a fourth area which is greater than the second specified distance from the front of the vehicle.

The vehicle control method may include determining whether to remove the virtual box, based on at least one of whether there is a virtual meta object, a shape formed by the second plurality of points included in the virtual box, a width of the virtual box, a length of the virtual box, or a height of a highest point of the virtual box, or any combination thereof.

For example, the vehicle control method may include determining whether the virtual box and the converted virtual track are associated with each other, based on a determination that there is the virtual meta object, that the shape formed by the second plurality of points included in the virtual box is a specified shape (e.g., an L-shape), that the width of the virtual box is less than a first reference length (e.g., about 1 m), that the length of the virtual box is less than the first reference length, and that the height of the highest point of the virtual box is greater than a second reference length (e.g., about 2 m) from the ground.

For example, the vehicle control method may include deleting the virtual box, based on a determination that the virtual box and the converted virtual track are associated with each other.

According to an aspect of the present disclosure, a vehicle control apparatus may include light detection and ranging (LiDAR), a memory, and a processor. The processor may generate a virtual meta object, based on receiving information associated with a first plurality of points identified at a first reference height or more from the ground by means of the LiDAR, may identify whether a converted virtual track and the virtual meta data are associated with each other, based on converting a virtual track stored in a first space of the memory into a time point when the virtual meta object is generated to obtain the converted virtual track, may identify whether there is the virtual meta object, based on that the virtual meta object and the converted virtual track are not associated with each other, may determine whether the virtual track is identified in a first area formed at a distance spaced apart at a first specified distance or more from the front of a vehicle, based on not generating the virtual meta object depending on not receiving the information, may store the virtual track identified in the first area in a second space different from the first space of the memory, and may activate a function for determining whether to remove at least one virtual box obtained from a second plurality of points identified by means of the LiDAR, using the virtual track stored in the second space, based on that the vehicle is traveling on a straight road. The virtual meta object may include a rectangle which is formed by the first plurality of points obtained by means of LiDAR and corresponds to an external object including a road sign. The virtual track may include a rectangle formed by a third plurality of points obtained at a time point different from the time point when the virtual meta object is generated.

In an example, the processor may identify whether the virtual meta object and the converted virtual track are associated with each other, based on at least one of a distance between a first center point of the virtual meta object and a second center point of the converted virtual track or a rate at which the virtual meta object and the converted virtual track overlap with each other, or any combination thereof.

In an example, the processor may overwrite the virtual track stored in the first space of the memory with the virtual meta data, based on that the virtual meta data and the converted virtual track are associated with each other.

In an example, the processor may identify that the virtual meta object and the converted virtual track are not associated with each other and may generate a second virtual track different from the converted virtual track which is a first virtual track, using the virtual meta object, based on that there is the virtual meta object.

In an example, the processor may delete the virtual track stored in the memory, based on that the vehicle is traveling on a road which is different from the straight road and includes at least one of curvature or a gradient, or any combination thereof.

In an example, the processor may delete the virtual track stored in the memory, based on that at least one of vertices forming the virtual track is identified, in a second area formed at less than the first specified distance from the front of the vehicle.

In an example, the processor may activate the function for determining whether to remove the at least one virtual box obtained by means of the LiDAR, using the virtual track, based on that at least one of vertices forming the virtual track is identified, in a third area which is greater than or equal to the first specified distance from the front of the vehicle and is formed at a second specified distance or less, the second specified distance being greater than the first specified distance.

In an example, the processor may deactivate the function for determining whether to remove the at least one virtual track identified by means of the LiDAR, based on all the vertices forming the virtual track are identified, in a fourth area greater than the second specified distance from the front of the vehicle.

In an example, the processor may determine whether to remove the at least one virtual box, based on at least one of whether there is the virtual meta data, a shape formed by the second plurality of points included in the at least one virtual box, a width of the at least one virtual box, a length of the at least one virtual box, or a height of a highest point of the at least one virtual box, or any combination thereof.

In an example, the processor may determine whether the at least one virtual box and the converted virtual track are associated with each other, based on that there is the virtual meta object, that the shape formed by the second plurality of points included in the at least one virtual box is a specified shape, that the width of the at least one virtual box is less than a first reference length, that the length of the at least one virtual box is less than the first reference length, and that the height of the highest point of the at least one virtual box is greater than a second reference length from the ground, and may delete the at least one virtual box, based on that the at least one virtual box and the converted virtual track are associated with each other.

According to another aspect of the present disclosure, a vehicle control method may include generating a virtual meta object, based on receiving information associated with a first plurality of points identified at a first reference height or more from the ground by means of light detection and ranging (LiDAR), identifying whether a converted virtual track and the virtual meta data are associated with each other, based on converting a virtual track stored in a first space of a memory into a time point when the virtual meta object is generated to obtain the converted virtual track, identifying whether there is the virtual meta object, based on that the virtual meta object and the converted virtual track are not associated with each other, determining whether the virtual track is identified in a first area formed at a distance spaced apart at a first specified distance or more from the front of a vehicle, based on not generating the virtual meta object depending on not receiving the information, storing the virtual track identified in the first area in a second space different from the first space of the memory, and activating a function for determining whether to remove at least one virtual box obtained from a second plurality of points identified by means of the LiDAR, using the virtual track stored in the second space, based on that the vehicle is traveling on a straight road. The virtual meta object may include a rectangle which is formed by the first plurality of points obtained by means of the LiDAR and corresponds to an external object including a road sign. The virtual track may include a rectangle formed by a third plurality of points obtained at a time point different from the time point when the virtual meta object is generated.

The vehicle control method may further include identifying whether the virtual meta object and the converted virtual track are associated with each other, based on at least one of a distance between a first center point of the virtual meta object and a second center point of the converted virtual track or a rate at which the virtual meta object and the converted virtual track overlap with each other, or any combination thereof.

The vehicle control method may further include overwriting the virtual track stored in the first space of the memory with the virtual meta data, based on that the virtual meta data and the converted virtual track are associated with each other.

The vehicle control method may further include identifying that the virtual meta object and the converted virtual track are not associated with each other; and generating a second virtual track different from the converted virtual track which is a first virtual track, using the virtual meta, based on that there is the virtual meta object.

The vehicle control method may further include deleting the virtual track stored in the memory, based on that the vehicle is traveling on a road which is different from the straight road and includes at least one of curvature or a gradient, or any combination thereof.

The vehicle control method may further include deleting the virtual track stored in the memory, based on that at least one of vertices forming the virtual track is identified, in a second area formed at less than the first specified distance from the front of the vehicle.

The vehicle control method may further include activating the function for determining whether to remove the at least one virtual box obtained by means of the LiDAR, using the virtual track, based on that at least one of vertices forming the virtual track is identified, in a third area which is greater than or equal to the first specified distance from the front of the vehicle and is formed at a second specified distance or less, the second specified distance being greater than the first specified distance.

The vehicle control method may further include deactivating the function for determining whether to remove the at least one virtual track identified by means of the LiDAR, based on that all the vertices forming the virtual track are identified, in a fourth area greater than the second specified distance from the front of the vehicle.

The vehicle control method may further include determining whether to remove the at least one virtual box, based on at least one of whether there is the virtual meta data, a shape formed by a plurality of points included in the at least one virtual box, a width of the at least one virtual box, a length of the at least one virtual box, or a height of a highest point of the at least one virtual box, or any combination thereof.

The vehicle control method may further include determining whether the at least one virtual box and the virtual track are associated with each other, based on that there is the virtual meta object, that the shape formed by the plurality of points included in the at least one virtual box is a specified shape, that the width of the at least one virtual box is less than a first reference length, that the length of the at least one virtual box is less than the first reference length, and that the height of the highest point of the at least one virtual box is greater than a second reference length from the ground, and deleting the at least one virtual box, based on that the at least one virtual box and the virtual track are associated with each other.

Figure 7:
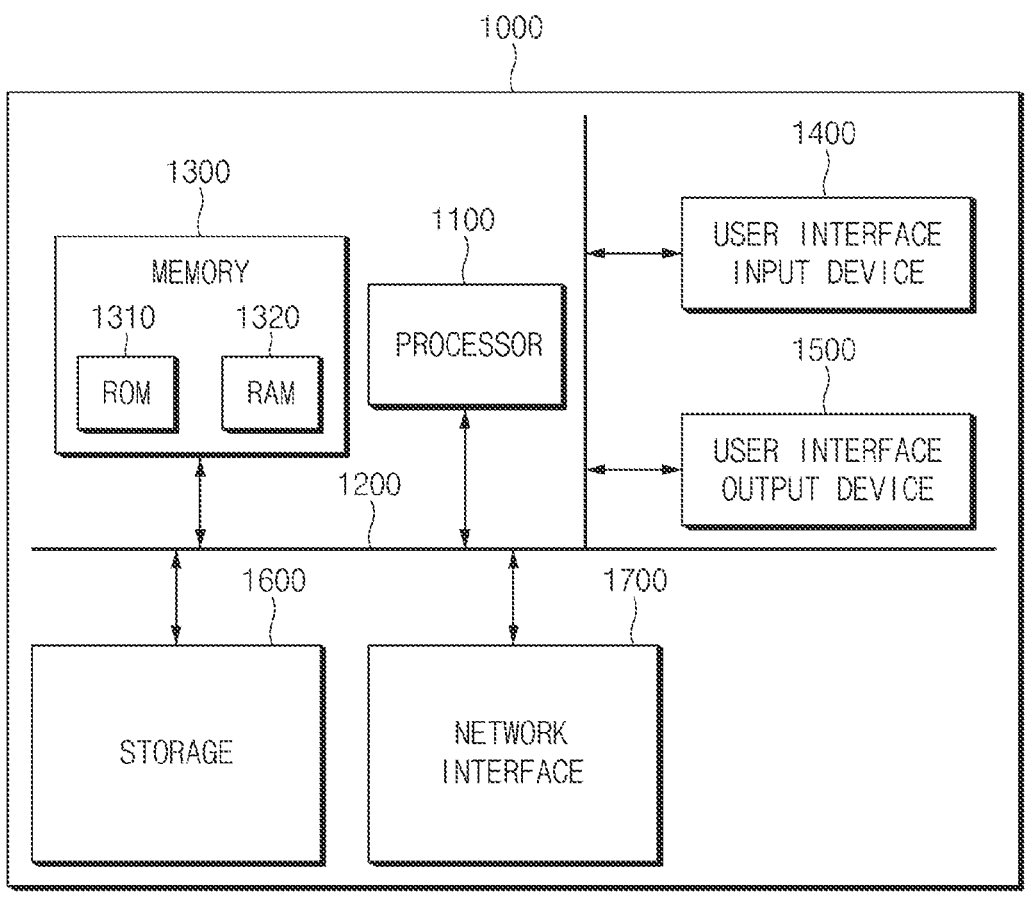
FIG. 7 illustrates an example of a computing system associated with a vehicle control apparatus or a vehicle control method.

FIG. 7 illustrates a computing system associated with a vehicle control apparatus.

Referring to FIG. 7, a computing system 1000 may include at least one processor 1100, a memory 1300, a user interface input device 1400, a user interface output device 1500, a storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (that is, the memory 1300 and/or the storage 1600) such as a RAM, a flash memory, a ROM, an EPROM, an EEPROM, a register, a hard disc, a removable disk, and a CD-ROM.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

The present technology may remove a virtual box generated by noise.

Furthermore, the present technology may identify noise generated by a road sign or a preceding vehicle and may remove a virtual box identified as noise.

Furthermore, the present technology may remove the virtual box identified as the noise to stably drive a vehicle control system associated with the vehicle control apparatus.

In addition, various effects ascertained directly or indirectly through the present disclosure may be provided.

Hereinabove, although the present disclosure has been described with reference to exemplary embodiment(s) and the accompanying drawings, the present disclosure is not limited thereto, but may be variously modified and altered by those skilled in the art to which the present disclosure pertains without departing from the spirit and scope of the present disclosure claimed in the following claims.

Therefore, examples of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A vehicle control apparatus, comprising:
at least one sensor;
a memory; and
a processor,
wherein the processor is configured to:
    generate, based on receiving information associated with a first plurality of points of an object, a virtual meta object, wherein the first plurality of points are identified by a detection result of the at least one sensor and positioned above a first reference height;
    determine whether a converted virtual track is associated with the virtual meta object, wherein a virtual track stored in a first space of the memory is converted into the converted virtual track corresponding to a time point when the virtual meta object is generated;
    determine whether an existence of the virtual meta object is valid, based on a determination that the virtual meta object and the converted virtual track are not associated with each other;
    determine whether a virtual track is identified in a first area formed at a distance spaced apart from a vehicle, based on not generating the virtual meta object and not receiving the information, wherein the distance is greater than a first distance;

store the virtual track identified in the first area in a second space different from the first space of the memory; and
    determine whether to remove at least one virtual box obtained from a second plurality of points identified by a detection result of the at least one sensor, using the virtual track stored in the second space,
    wherein the virtual meta object comprises a closed boundary which is formed by the first plurality of points, wherein the first plurality of points corresponds to the object that comprises a road sign, and
    wherein the virtual track comprises a second closed boundary formed by a third plurality of points obtained at a time point different from the time point when the virtual meta object is generated, and
    wherein the second closed boundary corresponds to the object.

2. The vehicle control apparatus of claim 1, wherein the processor is configured to:
    determine whether the virtual meta object and the converted virtual track are associated with each other, based on at least one of a distance between a first center point of the virtual meta object and a second center point of the converted virtual track or a rate at which the virtual meta object and the converted virtual track overlap with each other, or any combination thereof.

3. The vehicle control apparatus of claim 1, wherein the processor is configured to:
    overwrite the virtual track stored in the first space of the memory with the virtual meta object, based on a determination that the virtual meta object and the converted virtual track are associated with each other.

4. The vehicle control apparatus of claim 1, wherein the processor is configured to:
    determine that the virtual meta object and the converted virtual track are not associated with each other; and
    generate a second virtual track different from the converted virtual track which is a first virtual track, using the virtual meta object, based on a determination that an existence of the virtual meta object is valid.

5. The vehicle control apparatus of claim 1, wherein the processor is configured to:
    delete the virtual track stored in the memory, based on a determination that the vehicle is driving on a road which is different from a straight road and includes at least one of curvature or a gradient, or any combination thereof.

6. The vehicle control apparatus of claim 1, wherein the processor is configured to:
    delete the virtual track stored in the memory, based on a determination that at least one of vertices forming the virtual track is identified, in a second area formed at less than the first distance from the vehicle.

7. The vehicle control apparatus of claim 1, wherein the processor is configured to:
    determine whether to remove the at least one virtual box obtained by a detection result of the at least one sensor, using the virtual track, based on a determination that at least one of vertices forming the virtual track is identified, in a third area formed at a second distance from the vehicle, wherein the second distance is greater than the first distance.

8. The vehicle control apparatus of claim 7, wherein the processor is configured to:
    deactivate a function for determining whether to remove the virtual track identified by a detection result of the at least one sensor, based on all the vertices forming the virtual track being identified, in a fourth area spaced apart from the vehicle with a distance greater than the second distance.

9. The vehicle control apparatus of claim 7, wherein the processor is configured to:

determine whether to remove the at least one virtual box, based on at least one of a determination whether an existence of the virtual meta object is valid, a shape formed by the second plurality of points included in the at least one virtual box, a width of the at least one virtual box, a length of the at least one virtual box, or a height of a highest point of the at least one virtual box, or any combination thereof.

10. The vehicle control apparatus of claim 9, wherein the processor is configured to:

determine whether the at least one virtual box and the converted virtual track are associated with each other, based on a determination that an existence of the virtual meta object is valid, that the shape formed by the second plurality of points included in the at least one virtual box is a specified shape, that the width of the at least one virtual box is less than a first reference length, that the length of the at least one virtual box is less than the first reference length, and that the height of the highest point of the at least one virtual box is greater than a second reference length from the ground; and delete the at least one virtual box, based on a determination that the at least one virtual box and the converted virtual track are associated with each other.

11. A vehicle control method, comprising:

generating, based on receiving information associated with a first plurality of points of an object, a virtual meta object, wherein the first plurality of points are identified by a detection result of the at least one sensor and positioned above a first reference height;

determining whether a converted virtual track is associated with the virtual meta object, wherein a virtual track stored in a first space of a memory is converted into the converted virtual track corresponding to a time point when the virtual meta object is generated;

determining whether an existence of the virtual meta object is valid, based on a determination that the virtual meta object and the converted virtual track are not associated with each other;

determining whether a virtual track is identified in a first area formed at a distance spaced apart from a vehicle, based on not generating the virtual meta object and not receiving the information, wherein the distance is greater than a first distance;

storing the virtual track identified in the first area in a second space different from the first space of the memory; and determining whether to remove at least one virtual box obtained from a second plurality of points identified by a detection result of the at least one sensor, using the virtual track stored in the second space, wherein the virtual meta object comprises a closed boundary which is formed by the first plurality of points, wherein the first plurality of points corresponds to the object that comprises a road sign, and wherein the virtual track comprises a second closed boundary formed by a third plurality of points obtained at a time point different from the time point when the virtual meta object is generated, and wherein the second closed boundary corresponds to the object.

12. The vehicle control method of claim 11, further comprising:

determining whether the virtual meta object and the converted virtual track are associated with each other, based on at least one of a distance between a first center point of the virtual meta object and a second center point of the converted virtual track or a rate at which the virtual meta object and the converted virtual track overlap with each other, or any combination thereof.

13. The vehicle control method of claim 11, further comprising:

overwriting the virtual track stored in the first space of the memory with the virtual meta object, based on a determination that the virtual meta object and the converted virtual track are associated with each other.

14. The vehicle control method of claim 11, further comprising:

determining that the virtual meta object and the converted virtual track are not associated with each other; and generating a second virtual track different from the converted virtual track which is a first virtual track, using the virtual meta, based on a determination that an existence of the virtual meta object is valid.

15. The vehicle control method of claim 11, further comprising:

deleting the virtual track stored in the memory, based on a determination that the vehicle is driving on a road which is different from a straight road and includes at least one of curvature or a gradient, or any combination thereof.

16. The vehicle control method of claim 11, further comprising:

deleting the virtual track stored in the memory, based on a determination that at least one of vertices forming the virtual track is identified, in a second area formed at less than the first distance from the vehicle.

17. The vehicle control method of claim 11, further comprising:

determining whether to remove the at least one virtual box obtained by a detection result of the at least one sensor, using the virtual track, based on a determination that at least one of vertices forming the virtual track is identified, in a third area formed at a second distance from the vehicle, wherein the second distance is greater than the first distance.

18. The vehicle control method of claim 17, further comprising:

deactivating a function for determining whether to remove the virtual track identified by a detection result of the at least one sensor, based on that all the vertices forming the virtual track being identified, in a fourth area spaced apart from the vehicle with a distance greater than the second distance.

19. The vehicle control method of claim 17, further comprising:

determining whether to remove the at least one virtual box, based on at least one of a determination whether an existence of the virtual meta object is valid, a shape formed by a plurality of points included in the at least one virtual box, a width of the at least one virtual box, a length of the at least one virtual box, or a height of a highest point of the at least one virtual box, or any combination thereof.

20. The vehicle control method of claim 19, further comprising:

determining whether the at least one virtual box and the virtual track are associated with each other, based on a determination that an existence of the virtual meta object is valid, that the shape formed by the plurality of points included in the at least one virtual box is a specified shape, that the width of the at least one virtual box is less than a first reference length, that the length of the at least one virtual box is less than the first reference length, and that the height of the highest point of the at least one virtual box is greater than a second reference length from the ground; and deleting the at least one virtual box, based on a determination that the at least one virtual box and the virtual track are associated with each other.

* * * * *